US010279249B2

(12) United States Patent
Numaguchi et al.

(10) Patent No.: US 10,279,249 B2
(45) Date of Patent: May 7, 2019

(54) INFORMATION PROCESSING DEVICE AND INFORMATION PROCESSING METHOD

(71) Applicants: SONY CORPORATION, Tokyo (JP); SONY INTERACTIVE ENTERTAINMENT INC., Tokyo (JP)

(72) Inventors: Naoki Numaguchi, Tokyo (JP); Alexis Andre, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 50 days.

(21) Appl. No.: 15/516,182

(22) PCT Filed: Aug. 27, 2015

(86) PCT No.: PCT/JP2015/074168
§ 371 (c)(1),
(2) Date: Mar. 31, 2017

(87) PCT Pub. No.: WO2016/056317
PCT Pub. Date: Apr. 14, 2016

(65) Prior Publication Data
US 2017/0296913 A1 Oct. 19, 2017

(30) Foreign Application Priority Data
Oct. 8, 2014 (JP) .................. 2014-207406

(51) Int. Cl.
G06T 15/00 (2011.01)
A63F 13/213 (2014.01)
(Continued)

(52) U.S. Cl.
CPC .......... A63F 13/213 (2014.09); A63F 13/215 (2014.09); A63F 13/52 (2014.09);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 9,031,282 | B2* | 5/2015 | Park | G06T 7/0079 382/103 |
| 2013/0108115 | A1* | 5/2013 | Hwang | G06K 9/033 382/106 |
| 2015/0003687 | A1* | 1/2015 | Utsunomiya | G06K 9/00348 382/107 |

FOREIGN PATENT DOCUMENTS

| JP | 2008-073256 | 4/2008 |
| JP | 2013-050882 | 3/2013 |

(Continued)

OTHER PUBLICATIONS

Weller, et al., Posey: Instrumenting a Poseable Hub and Strut Construction Toy, Proceedings of the Second International Conference on Tangible and Embedded Interaction, 2008, pp. 1-8.

Primary Examiner — Gordon G Liu
(74) Attorney, Agent, or Firm — Paratus Law Group, PLLC

(57) ABSTRACT

On a play field 20 set in real space, a target region 102 having the play field 20 as a bottom surface and having a predetermined height h is set virtually. A target region image that expresses a distance of the target region 102 from an imaging surface as a pixel value on an image plane is generated, and compared with a depth image corresponding to an actual captured image 100; thus, only images of blocks 3c and 3b inside the target region 102 are extracted as detection and tracking targets.

10 Claims, 10 Drawing Sheets

(51) Int. Cl.
   *G06T 7/00* (2017.01)
   *A63F 13/65* (2014.01)
   *A63F 13/52* (2014.01)
   *A63F 13/215* (2014.01)
   *G06K 9/00* (2006.01)
   *G06K 9/46* (2006.01)
   *G06K 9/62* (2006.01)
   *G06T 7/215* (2017.01)
   *G06T 7/10* (2017.01)

(52) U.S. Cl.
   CPC .......... *A63F 13/65* (2014.09); *G06K 9/00771* (2013.01); *G06K 9/46* (2013.01); *G06K 9/4652* (2013.01); *G06K 9/6202* (2013.01); *G06T 7/00* (2013.01); *G06T 7/10* (2017.01); *G06T 7/215* (2017.01)

(58) Field of Classification Search
   USPC ........................................ 345/419
   See application file for complete search history.

(56) References Cited

FOREIGN PATENT DOCUMENTS

JP    2013-156671     8/2013
WO   WO2014/064870 A1   5/2014

* cited by examiner

FIG. 9
(a) 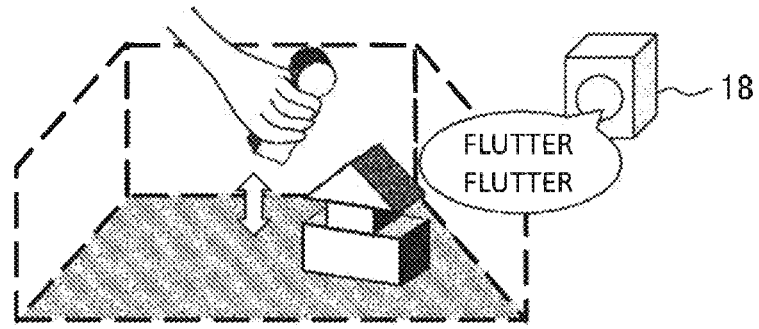
(b) 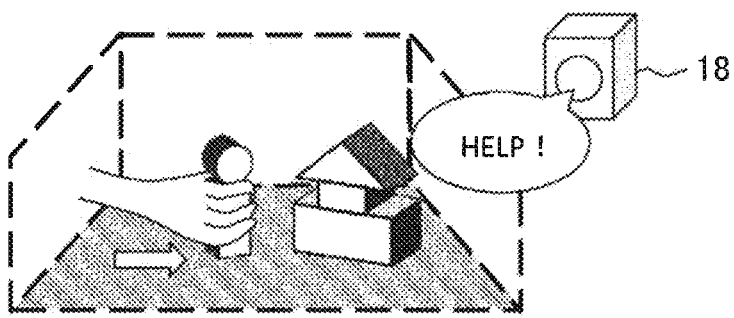
(c) 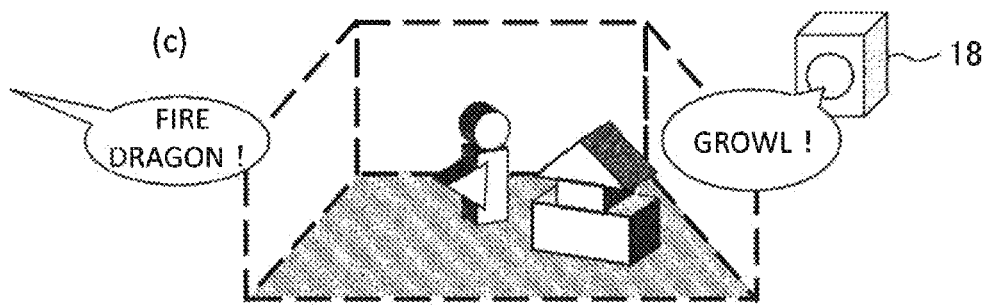

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2015/074168 (filed on Aug. 27, 2015) under 35 U.S.C. § 371, which claims priority to Japanese Patent Application No. 2014-207406 (filed on Oct. 8, 2014), which are all hereby incorporated by reference in their entirety.

TECHNICAL FIELD

The present invention relates to an information processing device and an information processing method that recognize and track real-world objects.

BACKGROUND ART

Conventionally, toys in which a three-dimensional object can be assembled by connecting a plurality of blocks and parts have been known. For example, blocks having basic shapes, such as a cube and a rectangular solid, which can be freely assembled according to a user's inspiration, and dedicated blocks and parts that are formed to be assembled in accordance with a design drawing into a three-dimensional object assumed in advance have been in widespread use. Moreover, a technology in which a computer recognizes a movement and a change in shape of an object in real space and performs some sort of information processing is expected to be applied to toys and learning materials (for example, see Patent Literature 1 and Non-Patent Literature 1).

CITATION LIST

Patent Literature

Patent Literature 1: JP 2008-73256A

Non-Patent Literature

Non-Patent Literature 1: Posey: Instrumenting a Poseable Hub and Strut Construction Toy, Michael Philetus Weller, Ellen Yi-Luen Do, Mark D Gross, Proceedings of the Second International Conference on Tangible and Embedded Interaction, 2008, pp 39-46

DISCLOSURE OF INVENTION

Technical Problem

Play and learning using only simplified objects like blocks find a limit in development. Hence, a technology has been proposed in which a computer recognizes an object to achieve advanced information processing, as described above. However, in the case where information processing is performed using a movement and a shape of an object as input information, the object itself needs to be recognized and distinguished from other objects. Techniques for detecting/recognizing an object include a technique based on a feature of the object itself, such as a shape or a feature point, and a technique in which a marker is added to the object.

The former technique requires information on the shape or the feature point to be registered in a database in advance, and an object that is not registered is excluded from targets. In addition, precision of processing such as detection, recognition, and tracking of an object is likely to change depending on an image capturing environment, such as surrounding brightness or presence of an object other than a target. The latter technique attaches a marker, which is originally unnecessary, thus making a user feel inconvenience in handling, and increasing factors of breakage.

In view of such problems, an object of the present invention is to provide a technology in which various types of information processing using real objects can be achieved easily with high precision.

Solution to Problem

In order to solve the above problems, an aspect of the present invention relates to an information processing device. The information processing device includes: a depth image acquiring unit configured to acquire a depth image that expresses a distance of an object present in a field of view of an imaging device from the imaging device as a pixel value on a captured image plane; a target region setting unit configured to virtually set a three-dimensional target region in a space in the field of view, and generate an image of the target region viewed from a same viewpoint as a viewpoint of the imaging device, in a same form as a form of the depth image; a target detecting unit configured to extract an image of an object in the target region from the depth image by comparing the depth image with the image of the target region; and an output unit configured to output data of at least one of an image and a sound on the basis of an extraction result.

Another aspect of the present invention relates to an information processing method. The information processing method includes: a step of acquiring a depth image that expresses a distance of an object present in a field of view of an imaging device from the imaging device as a pixel value on a captured image plane, and storing the depth image in a memory; a step of virtually setting a three-dimensional target region in a space in the field of view, and generating an image of the target region viewed from a same viewpoint as a viewpoint of the imaging device, in a same form as a form of the depth image; a step of extracting an image of an object in the target region from the depth image by comparing the depth image read from the memory with the image of the target region; and a step of outputting data of at least one of an image and a sound on the basis of an extraction result.

An arbitrary combination of the components described above, and an expression of the present invention converted between a method, a device, a system, a recording medium, a computer program, and the like are also effective as an aspect of the present invention.

Advantageous Effects of Invention

According to the present invention, play and games using real objects can be increased in variety easily.

BRIEF DESCRIPTION OF DRAWINGS

FIG. 9 schematically illustrates how a sound is output when a labeled block satisfies a predetermined condition in S28 of the flowchart of FIG. 7.

MODE(S) FOR CARRYING OUT THE INVENTION

Figure 1:
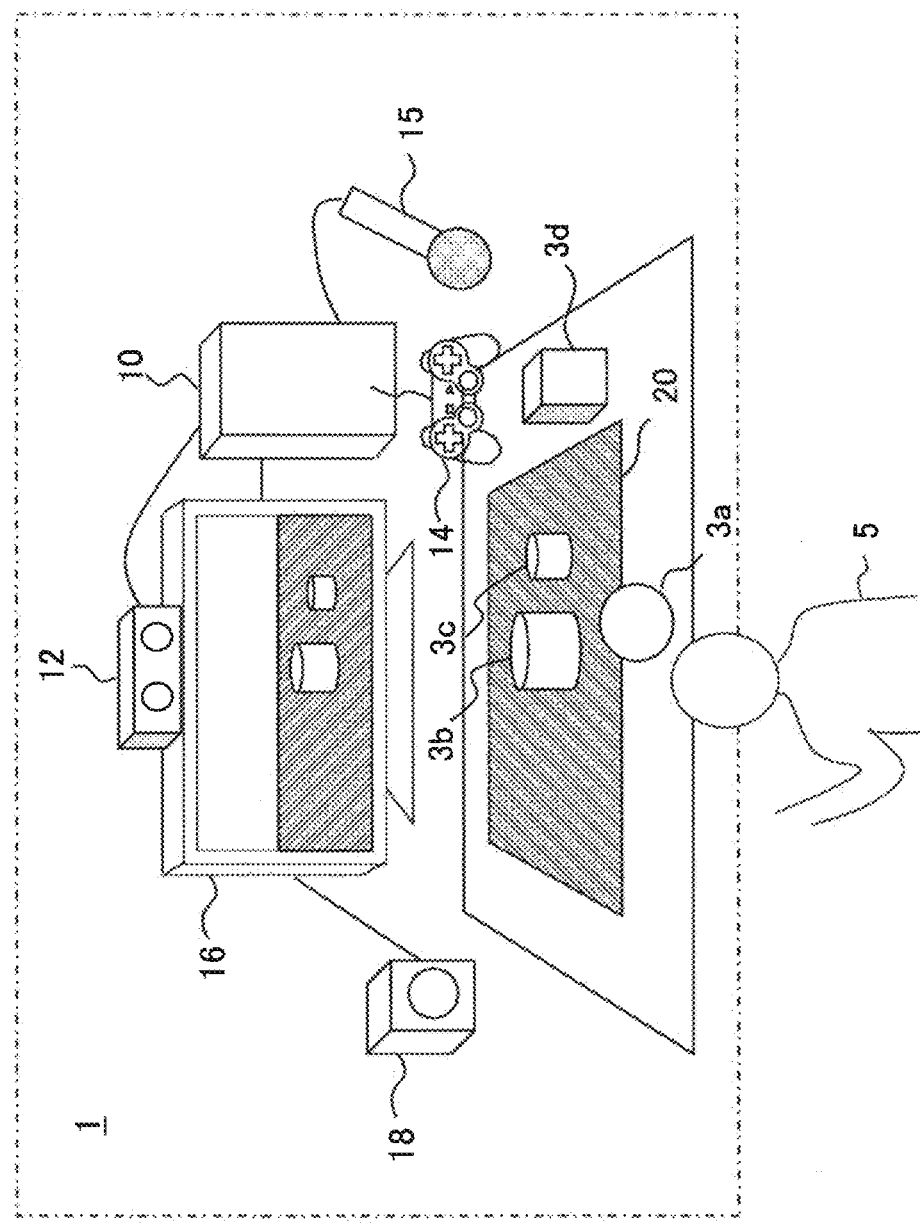
FIG. 1 illustrates a configuration example of an information processing system to which the present embodiment can be applied.

FIG. 1 illustrates a configuration example of an information processing system to which the present embodiment can be applied. An information processing system 1 includes blocks 3a, 3b, 3c, and 3d that a user 5 can move and assemble in the real world, an information processing device 10 that performs information processing according to a state of the blocks, an input device 14 that accepts user operation on the information processing device 10, a microphone 15 that acquires surrounding sound as input information, and a display device 16 and a speaker 18 that output an image and a sound according to a movement and the like of a block. The information processing system 1 further includes a play field 20 in which to place a block and an imaging device 12 that captures an image of real space including the play field 20.

The information processing device 10 may be a game device or a personal computer, for example, and may implement an information processing function by is loading a necessary application program. The display device 16 may he a general display, such as a liquid crystal display, a plasma display, or an organic EL display. The speaker 18 may be a speaker that outputs an audio signal as sound, or any of a buzzer, a chime, and the like, and is not limited in number or number of channels. The display device 16 and the speaker 18 may be integrally formed as a television. Note that one of the display device 16 and the speaker 18 may be omitted in some cases.

The imaging device 12 is a stereo camera composed of two cameras that capture images of the same space from left and right positions having a known interval therebetween, each camera including an image sensor, such as a charge coupled device (CCD) or a complementary metal oxide semiconductor (CMOS). Alternatively; the imaging device 12 may be configured with a monocular video camera and a sensor capable of acquiring a distance of a subject from an imaging surface. As the sensor capable of acquiring a distance of a subject, a device that irradiates a target with reference light, such as infrared rays, and detects reflected light thereof may be used.

The input device 14 is operated by the user 5 to accept a request for start/end of processing, selection of a function, or the like and supply the request as an electrical signal to the information processing device 10. The input device 14 may be any one or a combination of general input devices, such as a game controller, a keyboard, a mouse, a joystick, and a touchpad provided on a screen of the display device 16. The microphone 15 may be a general microphone that acquires a sound uttered by the user 5 or the like, converts the sound into an electrical signal, and supplies the electrical signal to the information processing device 10.

The play field 20 is a mat that is made of cloth, vinyl, a plate, or the like and can be spread or placed on a plane. The play field 20 constitutes a surface where the block 3b or the like is placed and defines a processing target space. The shape of the play field 20 is not limited, and may be a polygon, including a quadrangle illustrated in the drawing, or a shape surrounded by a curved line, such as a circle or an oval. The blocks 3a, 3b, 3c, and 3d each may be an object with a simple shape, such as a sphere, a rectangular solid, or a cylinder, as illustrated in the drawing, or may be an object with a more complicated shape, such as a miniature of an object in the real world (e.g., a doll or a minicar) or a part thereof, or a piece in a game. The blocks 3a, 3b, 3c, and 3d are not limited in size, material, color, or number. Furthermore, the blocks 3a, 3b, 3c, and 3d may have a structure to be assembled by a user, or may be a finished object.

The information processing device 10 detects and tracks a block present in a space defined by the play field 20. Specifically, the information processing device 10 virtually sets a region having a region indicated by the play field 20 as a bottom surface and having a predetermined height, with respect to three-dimensional real space. Then, the information processing device 10 detects and tracks only a block that is put inside the region by the user. In this manner, a block that the user intentionally places or moves can be distinguished from a surrounding object or person easily.

Consequently, the load of processing can be reduced while the precision of detection/tracking processing is improved. Moreover, the user him/herself can designate a block to be recognized by the information processing device 10 through a simple operation of moving the block onto the play field 20. Hereinafter, a virtual region that the information processing device 10 sets in a three-dimensional space in this manner will be called "target region".

The information processing device 10 is connected to the imaging device 12, the input device 14, the microphone 15, the display device 16, and the speaker 18 by wire or wirelessly; the connection may be via various networks. Alternatively, any two or all of them may be combined to be integrally installed. In the example of FIG. 1, the blocks 3b and 3c on the play field 20, among the blocks 3a, 3b, 3c, and 3d, serve as processing targets, and the display device 16 displays an image in which the blocks 3b and 3c look as if reflected in a mirror. Note that an image to display is not limited to this image, and may be decided as appropriate according to contents of processing that the information processing device 10 performs.

For example, in the case where the information processing device 10 executes an electronic game that progresses according to positions of blocks, the display device 16 displays a screen of the game. In the case where the information processing device 10 provides information on how to assemble blocks, the display device 16 displays an image expressing the next assembly step, according to the current situation of the blocks. As described above, information processing without image display may be performed. Thus, there is no particular limitation on contents of information processing that the information processing device 10 performs on the basis of block detection results and block tracking results; hence, description will hereinafter be given with a focus on processing for detecting and tracking blocks.

Figure 2:
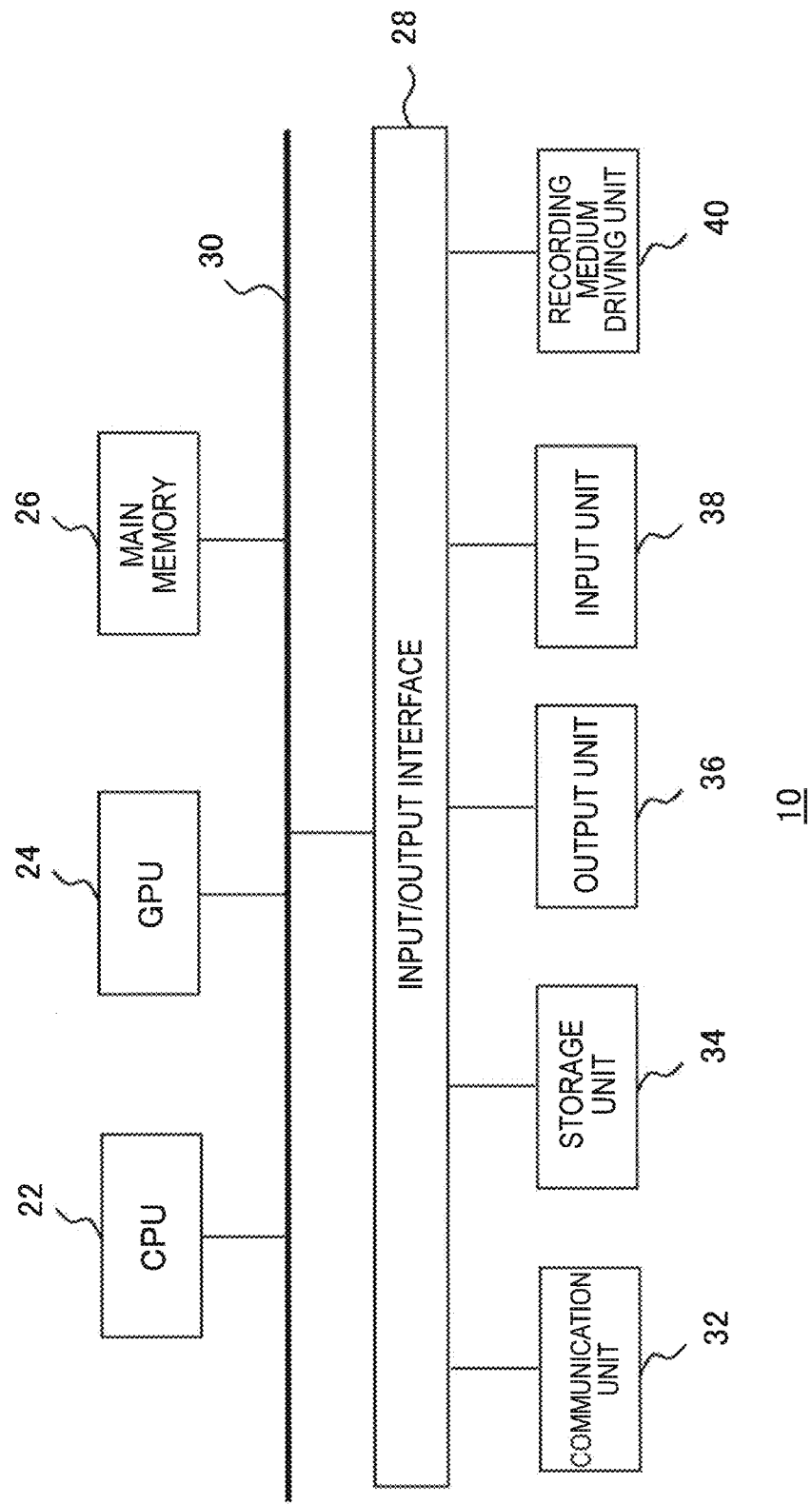
FIG. 2 illustrates an internal circuit configuration of an information processing device in the present embodiment.

FIG. 2 illustrates an internal circuit configuration of the information processing device 10. The information processing device 10 includes a central processing unit (CPU) 22, a graphics processing unit (GPU) 24, and a main memory 26. The CPU 22 controls processing and signal transmission in components inside the information processing device 10, on the basis of a program of an operating system, an application, or the like. The GPU 24 performs image processing. The main memory 26 is configured with a random access memory (RAM) and stores a program and data that are necessary for processing.

These units are connected to each other via a bus 30. An input/output interface 28 is further connected to the bus 30. To the input/output interface 28 are connected a peripheral equipment interface, such as USB or IEEE 1394, a communication unit 32 composed of a network interface of a wired or wireless LAN, a storage unit 34, such as a hard disk drive or a nonvolatile memory, an output unit 36 that outputs data to an output device (e.g., the display device 16 and the speaker 18), an input unit 38 through which data is input from the imaging device 12, the input device 14, and the microphone 15, and a recording medium driving unit 40 that drives a removable recording medium, such as a magnetic disc, an optical disc, or a semiconductor memory.

The CPU 22 controls the entire information processing device 10 by executing an operating system stored in the storage unit 34. The CPU 22 also executes various programs that are read from a removable recording medium and loaded into the main memory 26 or downloaded via the communication unit 32. The GPU 24 has a geometry engine function and a rendering processor function, and performs rendering processing in accordance with a rendering command from the CPU 22 and stores a display image in a frame buffer (not illustrated). Then, the GPU 24 converts the display image stored in the frame buffer into a video signal and outputs the video signal to the output unit 36.

Figure 3:
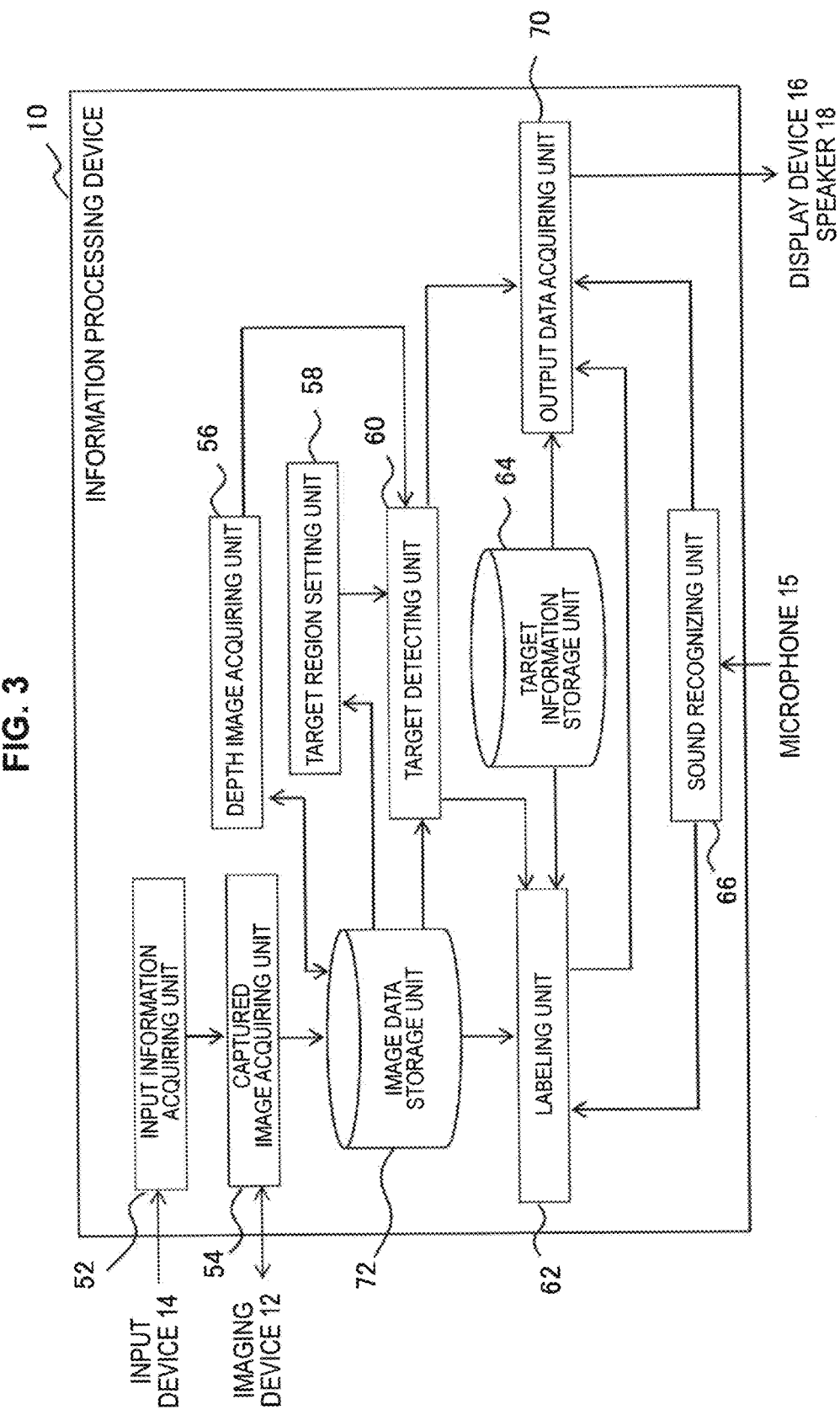
FIG. 3 illustrates a configuration of functional blocks of an information processing device in the present embodiment.

FIG. 3 illustrates a configuration of functional blocks of the information processing device 10. The functional blocks illustrated in FIG. 3 can be implemented, in terms of hardware, by the CPU 22, the GPU 24, the main memory 26, the output unit 36, the input unit 38, and the like illustrated in FIG. 2, and implemented, in terms of software, by a program or the like loaded into the main memory 26 from the storage unit 34 or from a recording medium via the recording medium driving unit 40. Accordingly, it would be understood by those skilled in the art that these functional blocks can be implemented in various ways by only hardware, only software, or a combination thereof, without being limited to any of them.

The present embodiment mainly includes processing for setting a target region and processing for detecting/tracking a block by using the target region. The information processing device 10 includes an input information acquiring unit 52 that acquires information on user operation accepted by the input device 14, a captured image acquiring unit 54 that acquires data of a captured image from the imaging device 12, a depth image acquiring unit 56 that generates a depth image using the captured image, a target region setting unit 58 that sets a target region and expresses the target region as a depth image, and a target detecting unit 60 that detects and tracks a block.

The information processing device 10 further includes a labeling unit 62 that labels a detected block, a sound recognizing unit 66 that recognizes a sound acquired by the microphone 15, an output data acquiring unit 70 that generates output data according to a label, a position, a movement, and the like of a block, an image data storage unit 72 that stores data of an image used for processing, such as a captured image and a depth image, and a target information storage unit 64 that stores information on a block and information necessary for generating output data.

The input information acquiring unit 52 notifies the functional blocks of contents of operation performed by the user via the input device 14, as appropriate. This operation includes requests for the start and end of information processing of a game or the like, and command input during processing. The imaging device 12 is also notified of a request for start/end of processing via the captured image acquiring unit 54; thus, start/end of moving image capturing in the imaging device 12 is controlled.

The captured image acquiring unit 54 acquires frame data of a moving image obtained by image capturing at a predetermined rate. The frame data is a stereo image obtained by capturing images of the same space from left and right viewpoints. The predetermined rate may be a frame rate of the moving image that the imaging device 12 captures or a rate smaller than that. The captured image acquiring unit 54 stores the acquired data of the stereo image in the image data storage unit 72.

The depth image acquiring unit 56 reads the data of the stereo image from the image data storage unit 72, and generates a depth image. The depth image is an image in which a distance, from an imaging surface, of a subject that appears in a captured image of one camera of the stereo camera is expressed as a pixel value on a plane of the captured image. A technology of acquiring a distance of a subject on the basis of the triangulation principle by using parallax in images captured from left and right different viewpoints by a stereo camera is not described here because it is widely known.

The depth image may be generated at the same rate as that of the acquisition of the stereo image, or a rate smaller than that. The depth image acquiring unit 56 sequentially adds identification information (e.g., a frame number) to the generated depth image and stores the depth image in the image data storage unit 72, and then provides notification thereof to the target detecting unit 60, together with the identification information. In the case where the imaging device 12 is a monocular camera and a sensor capable of acquiring a distance of a subject, a depth image generated by the sensor by a Time of Flight (TOF) technique, for example, may be used as it is.

In this case, the captured image acquiring unit 54 may acquire data of a captured image and a depth image from the imaging device 12 and store the data in the image data storage unit 72. The depth image may be generated using any other practicable technique. In the following description, a color image captured by one camera of the stereo camera or a color image captured by a monocular camera is collectively called "captured image" in some cases.

The target region setting unit 58 sets a target region on the basis of the captured image stored in the image data storage unit 72, and then expresses the target region as a depth image. This depth image is an image in which distances, from the imaging surface, of at least two or more side surfaces of a virtual three-dimensional object that has the play field 20 as a bottom surface, has a predetermined height, and expresses a target region and the bottom surface of the play field 20 are expressed as pixel values on a view plane of the imaging device 12. Hereinafter, such a virtual depth image will be called "target region image". In creating a target region image, the actual depth image generated by the depth image acquiring unit 56 may be used as well as the captured image. The target region setting unit 58 supplies data of the generated target region image to the target detecting unit 60.

Each time a depth image is generated at a predetermined rate, the target detecting unit 60 reads data of the depth image from the image data storage unit 72, and compares the data with the target region image acquired from the target region setting unit 58, thereby detecting and tracking a block inside the target region. A virtually set target region is expressed as a depth image viewed from the same viewpoint as a depth image generated from a real-world captured image, on the basis of a position and an attitude of the play field 20, which means that positions on image planes of the two images correspond to each other. Thus, inside/outside determination of an image of an object in the depth image with respect to the target region can be performed for each pixel.

Then, an image outside the target region is excluded from processing targets, and further, an image of a block inside the target region is separated from an image of the play field 20. Consequently, a depth image expressing only the image of the block inside the target region can be acquired; thus, presence of such a block can be detected, and also a change in position can be tracked by repeating the operation at a predetermined rate. Note that in tracking, in addition to extraction of an image of the block, confusion with another block may be prevented by confirming continuity from the previous frame by using another feature.

Features that can be used here include a surface feature, such as a color and a texture of an image in the captured image, a geometric feature, such as an outline obtained from an edge image, a feature in a temporal direction, such as an amount of movement and a movement direction, and a feature as a statistical model, such as distribution of pixel values. Tracking precision may be further increased by affixing a marker (e.g., a two-dimensional bar code) to a block or attaching an attitude sensor, and merging information obtained therefrom.

When detecting entrance of a new block to the target region, the target detecting unit 60 provides notification thereof to the labeling unit 62, together with positional information of the block. In addition, the target detecting unit 60 sequentially supplies tracking results, i.e., positional information for each frame, of the detected block to the output data acquiring unit 70 until the block exits the target region.

The labeling unit 62 adds, to the detected block, a "label" that decides data to he output according to a movement, a position, and the like of the block. The "label" is typically a name of an object. For example, a block is named "car", So that a sound effect is produced or display is performed to express a car running, in response to a movement of the block. Two blocks are named "hero" and "monster", so that a sound effect is produced or display is performed to express a fight going on, in response to a movement of the blocks crossing each other.

Note that the "label" is not limited to a name of an object. In a situation where there is no need to liken a block to some sort of object (e.g., when the block is used as a piece in a game), the "label" may he an identification number or the like. In any case, the target information storage unit 64 stores output contents information in which "labels" are associated with data to be output according to positions and movements thereof, and the labeling unit 62 adds one of the labels to the detected block. The label to add may he decided on the basis of a visual feature; such as a shape, a size, a color, or a pattern, of the block, or may he designated on-site by the user.

In the former case, the target information storage unit 64 further stores block feature information in which visual features of blocks are associated with labels. The labeling unit 62 acquires a visual feature of a block that is present at a position of which notification is provided from the target detecting unit 60, by using a captured image read from the image data storage unit 72. Then, the labeling unit 62 refers to the block feature information, thereby specifying a label associated with the feature and adding the label. In the latter case, a name that the user says on-site or inputs using the input device 14 is added as a label. The labeling unit 62 notifies the output data acquiring unit 70 of a label added to a block and positional information of the block at the time when the label is added.

The sound recognizing unit 66 recognizes the user's sound acquired by the microphone 15 as a word. As a sound recognition technology, various techniques have been in wide practical use; any of such techniques may be employed here. The labeling unit 62 is notified of information of the recognized word; thus, the word (here, a name of an object, etc.) is added as a label to a block.

The sound recognizing unit 66 may further notify the output data acquiring unit 70 of information of the recognized word so that some sort of output is produced in response to the word. For example, when the user places a new block in the target region and then says "car", a label of "car" is added to the block and an engine racing sound is output. Output in response to a sound may be produced at a timing other than the timing of labeling. Furthermore, a word recognized by the sound recognizing unit 66 may be used as a voice command. In this case, the sound recognizing unit 66 notifies the input information acquiring unit 52 of information of the word; thus, various user operations, such as start/end of processing, are accepted in a manner equivalent to that of input from the input device 14.

The output data acquiring unit 70 acquires data of a sound and an image to be output according to a position and a movement of a labeled block, and outputs the data to the speaker 18 and the display device 16. Therefore, the output data acquiring unit 70 continuously keeps acquiring positional information of a block inside the target region from the target detecting unit 60, and decides output data according to a label and a movement of the block, on the basis of output contents information of the target information storage unit 64. The output contents information is, basically, information in which a label of a block, a condition imposed on the block's position, movement, or positional relation to another block, and data of a sound and data of an image to be output when the condition is satisfied are associated with each other.

When a condition set in the output contents information is satisfied, the output data acquiring unit 70 supplies data to be output to the speaker 18 and the display device 16 as appropriate, so that a sound is output and a display image is updated. In the output contents information, a program in which information processing to be performed is described may be associated, as well as data of a sound and an image as output data. In this case, the output data acquiring unit 70 may execute the information processing when the set condition is satisfied, and output resulting data of a sound and an image to the speaker 18 and the display device 16. Note that data of a sound and an image to be output, a program to be executed, data of an object model used for display, and the like are also stored in the target information storage unit 64.

Figure 4:
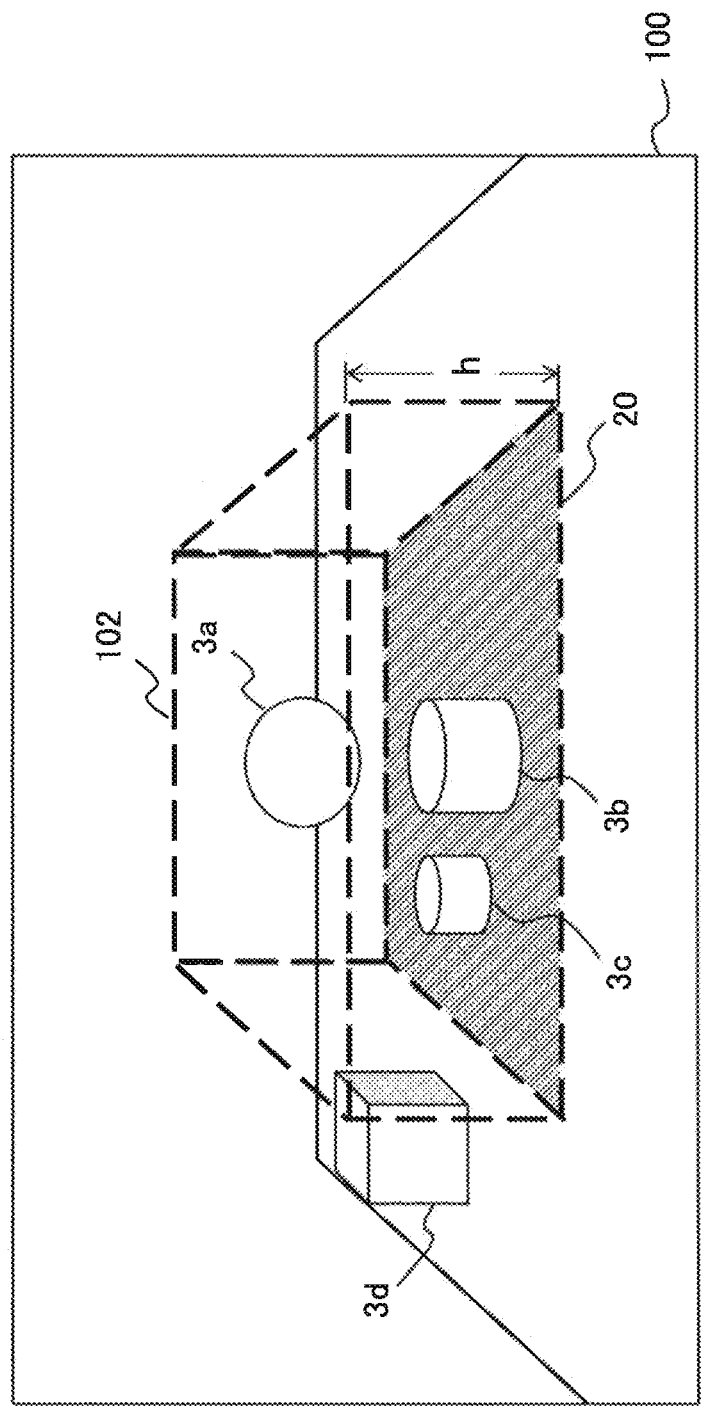
FIG. 4 is a drawing for describing a target region in the present embodiment.

FIG. 4 is a drawing for describing a target region in the present embodiment, and illustrates a captured image 100 in the image capturing environment of FIG. 1. Note that a three-dimensional object indicated by dotted lines is a target region 102, which is not seen in the actual captured image. The target region setting unit 58 extracts an image of the play field 20 from the captured image 100, and sets the target region 102 having the image of the play field 20 as a bottom surface and having a predetermined height h. The height h is decided in a range within a field of view of the imaging device 12, and for example is set to 50 cm.

If a length of each side of the play field 20 is known, the number of pixels expressing the height 11 on the image can be found from a ratio to the number of pixels expressing a length of a side of the play field 20. Even in the case where the size of the play field 20 is unknown, an on-image length expressing the height h at each position is found on the basis of a distance of each vertex of the play field 20 from the imaging surface, if a change in a ratio between the actual size of a subject and the size (number of pixels) of an image thereof in the captured image, relative to the distance from the imaging surface, is acquired by calibration.

In an image capturing space illustrated in the drawing, four blocks 3a, 3b, 3c, and 3d are present in the field of view of the imaging device 12, and two blocks 3 b and 3c among them are placed on the play field 20. The target detecting unit 60 excludes, from a depth image corresponding to the captured image 100, images of objects outside the target region 102, and further excludes the image of the bottom surface of the target region 102, i.e., the play field 20, to leave only images of the blocks 3c and 3b. This makes it possible to efficiently detect and track only blocks that are intentionally placed by the user.

Figure 5:
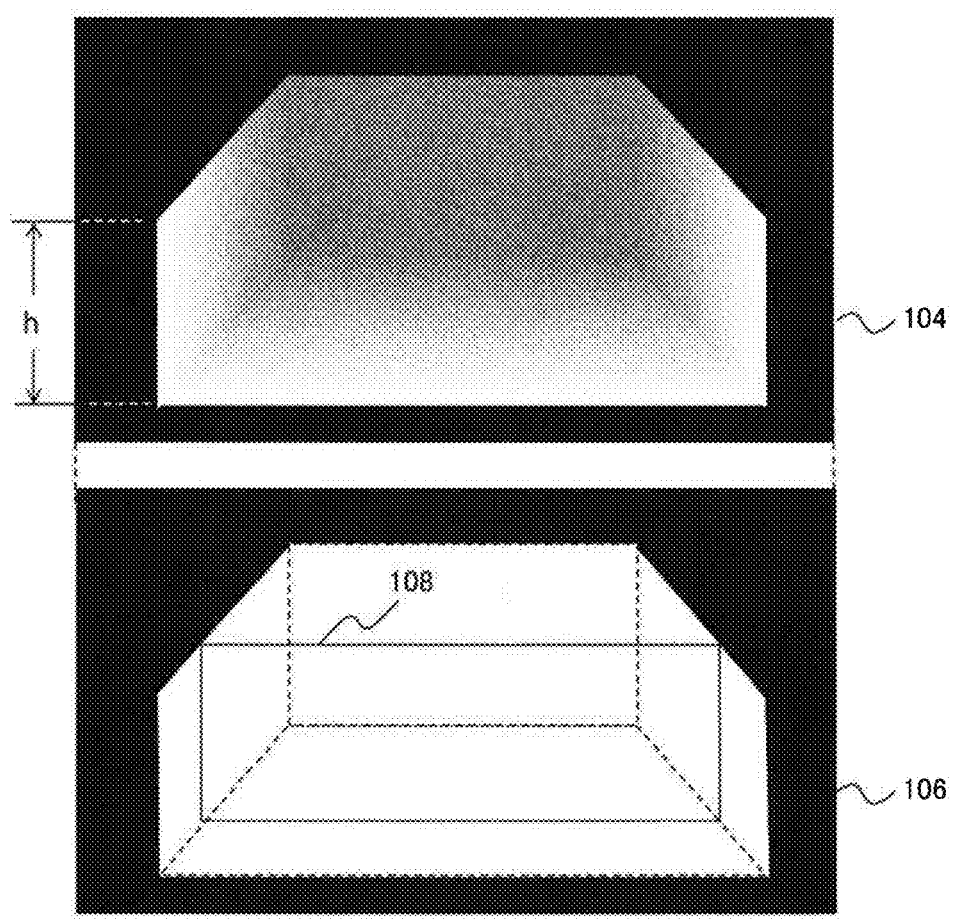
FIG. 5 schematically illustrates an example of a target region image in the present embodiment.

FIG. 5 schematically illustrates an example of a target region image that the target region setting unit 58 generates. A target region image 104 expresses a bottom surface and side surfaces of the target region as a depth image as described above, and the example of the drawing corresponds to the target region 102 illustrated in FIG. 4. This depth image has a format in which positions farther from the imaging surface have lower luminances, but a format of a depth image is not limited to this format.

The target region setting unit 58, for example, extracts a region of the image of the play field 20 in the captured image in a state where no block is placed in the target region, on the basis of color information, a marker printed on a mat, or the like, and specifies a corresponding region in the actual depth image. Then, the target region setting unit 58 generates a depth image composed of only the region, as an intermediate image. Furthermore, the target region setting unit 58 decides an on-image length of the predetermined height h by the above-described technique, and expresses left and right side surfaces and a side surface at the back (back surface), as viewed from the imaging device 12, in the form of a depth image in the intermediate image, thereby completing a target region image.

Positions of the left and right side surfaces in the depth direction are made to correspond to positions of left and right sides of the play field 20 in the depth direction. A position of the back surface is made to correspond to a position of a side at the back of the play field 20. Defining the surfaces in the three directions and the bottom surface in this manner defines a cross-section (e.g., a cross-section 108) of the target region as illustrated in an explanatory diagram 106 in the lower stage. Accordingly, for example, if inside/outside determination is performed with respect to a cross-section at positions of the same distance from the imaging surface, for each pixel of the actual depth image, pixels outside the target region can be specified and excluded.

Actually, a side surface of the target region is not necessarily orthogonal to axes of a camera coordinate system, depending on an angle formed by the play field 20 and an optical axis of the imaging device 12. Hence, the angle is acquired on the basis of the shape of the image of the play field 20 in the captured image, or the like; thus, directions of a surface of the play field 20 and a surface perpendicular thereto in the camera coordinate system are derived. In this manner, side surfaces and a back surface of the target region that rise perpendicularly from the play field 20 can be rendered from a viewpoint corresponding to the imaging device 12. Also in this case, inside/outside determination of pixels is similar to that described above, Note that in a situation where strict perpendicularity of a side surface is not required, a surface perpendicular to the optical axis may be set as a direction of the back surface of the target region, and a surface parallel to the optical axis may be set as a direction of a side surface of the target region. FIG. 5 illustrates a case where the shape of the play Field 20 is a quadrangle; however, even if the shape is a circle or a polygon other than a quadrangle, as long as a side surface is formed in a manner that a cross-sectional shape can be defined with respect to the distance from the imaging surface, other processing is performed similarly.

Figure 6:
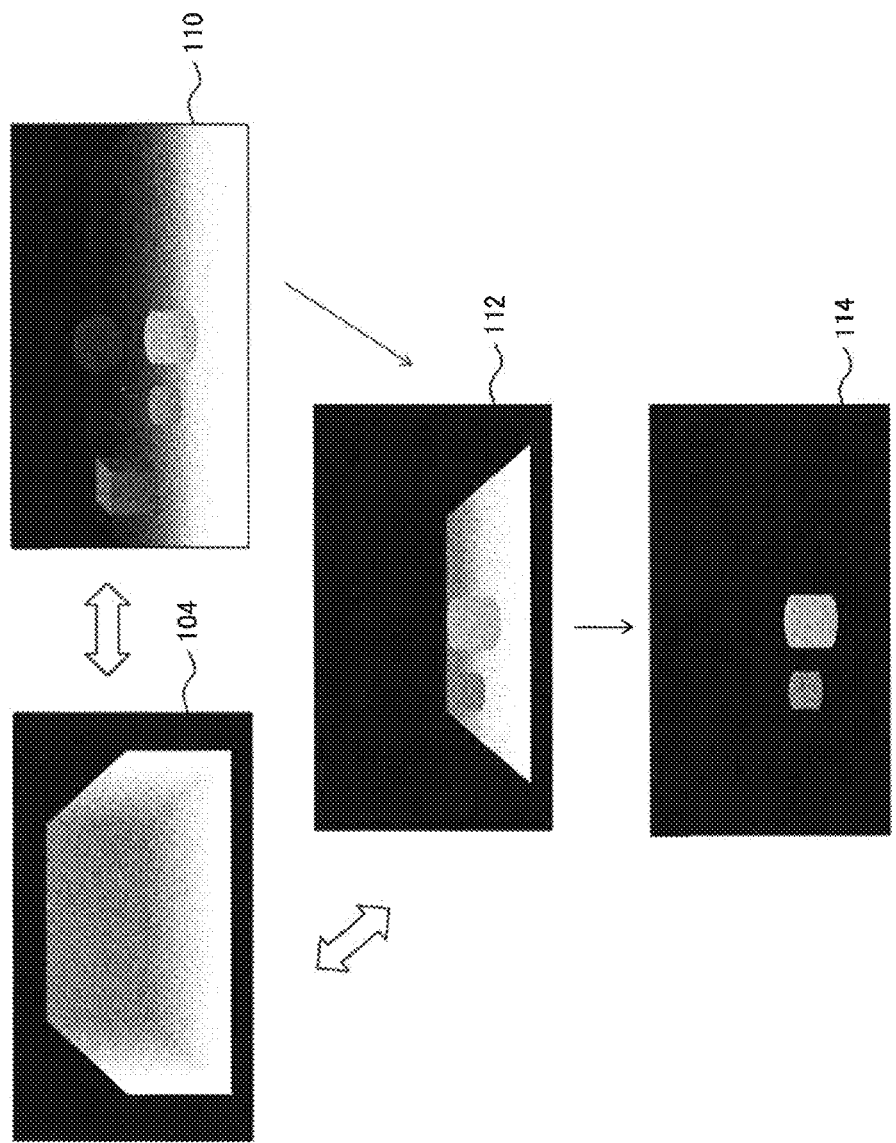
FIG. 6 schematically illustrates how a target detecting unit extracts images of blocks present in a target region in the present embodiment.

FIG. 6 schematically illustrates how the target detecting unit 60 extracts images of blocks present in the target region. In the upper left of the drawing is the target region image 104 illustrated in FIG. 5. In the upper right is illustrated a depth image 110 that the depth image acquiring unit 56 acquires, which corresponds to the captured image 100 illustrated in FIG. 4. The target detecting unit 60 compares the two images and performs inside/outside determination with respect to the target region for each pixel as described above, to leave only images inside the target region (image 112).

Furthermore, a difference between the image of the bottom surface of the target region, i.e., the play field 20, and the image 112 is obtained; thus, an image 114 composed of only images of blocks, excluding the image of the play field 20, can be acquired. Note that the drawing illustrates the image 112, which is an intermediate image, for description, but the image 114 can actually be acquired in one scan if processing for excluding images outside the target region and processing for excluding the image of the play field 20 are performed concurrently for each pixel.

Moreover, in excluding the play field 20, precision may be increased by using color information of the captured image. In this case, greater differences between the color of the play field 20 and the color of a block allow an image of the block to be left with higher precision. Therefore, the information processing device 10 may acquire the color of the play field 20 in an initial stage, and notify the user of limitation on the color of a block to use.

Figure 7:
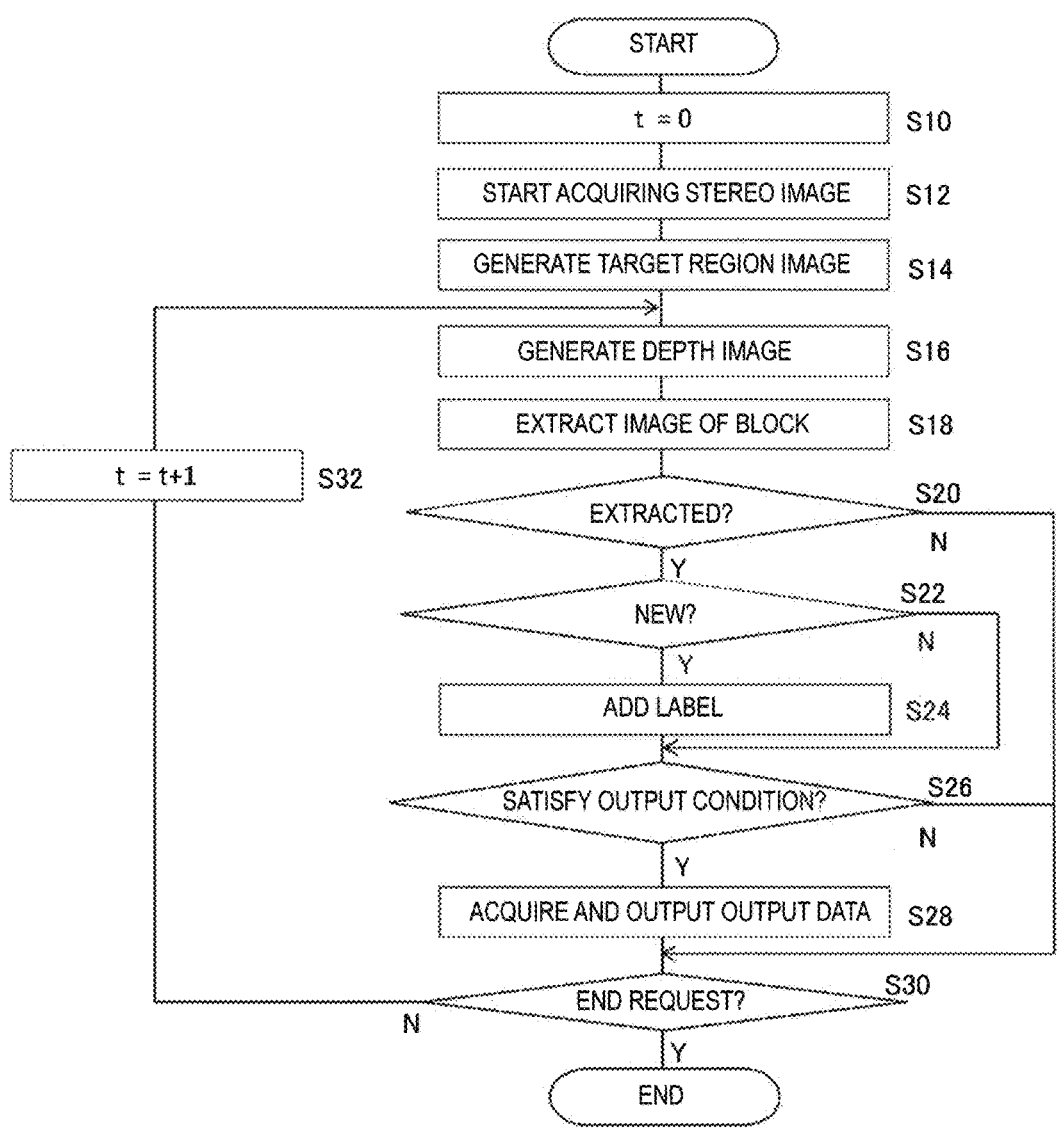
FIG. 7 is a flowchart showing a processing sequence in which an information processing device performs detection and tracking of a block, and output according to results thereof in the present embodiment.

Next, description will be given on operation of the information processing device 10 implemented by the configuration described above. FIG. 7 is a flowchart showing a processing sequence in which the information processing device 10 performs detection and tracking of a block, and output according to results thereof The processing shown here is started when the user requests the information processing device 10 to start processing via the input device 14 or the like. Timings at which frames of a moving image, which is a captured image, are obtained are indicated as times t=0, 1, 2, . . . .

First, at initial time t=0, the captured image acquiring unit 54 starts acquiring a stereo image captured by the imaging device 12 (S10, S12). Then, the target region setting unit 58 extracts an image of the play field 20 from one captured image of the stereo image, and expresses a three-dimensional object obtained by adding side surfaces to three sides of the image in the form of a depth image, thereby generating a target region image (S14). In order to extract the image of the play field 20 with high precision and generate a target region image accurately, it is desirable to notify the user not to put a block in the target region until the target region image is generated. Note that the play field 20 can he extracted precisely even in a state where a block is put in, by acquiring color information of the play field 20 and the like beforehand or dividing a mat or the like into a region for generating the target region image and the other region.

If the brightness of the image capturing environment and a color, a pattern, and the like of the play field 20 are acquired accurately by capturing an image of a state where there is no block in the target region, (1) adjustment of image capturing conditions, such as exposure time and white balance, (2) adjustment of parameters used for noise cancellation and image correction during image analysis, and (3) separation between the image of the play field 20 and an image of a block thereon can be performed with high precision. Furthermore, imaging capturing with such a simple composition enables highly precise estimation of a position of a light source.

In this manner, even in the case where a block is replaced by a 3D model and displayed as will be described later, it is possible to make shading giving realistic feeling, in which the actual position of the light source is reflected. Furthermore, it is possible to estimate the influence of reflection of light, or the like, and exclude the influence of ambient light on the block. On the other hand, the depth image acquiring unit 56 generates a depth image corresponding to real space by using the stereo image at time t=0 (S16). Subsequently, the target detecting unit 60 compares the target region image generated in S14 with the depth image of real space generated in S16 as described above, thereby extracting an image of a block present in the target region (S18).

If some sort of image is extracted on this occasion (Y of S20), the image is qualified as a block, and the labeling unit 62 adds a label (Y of S22, S24). As described above, this processing includes a case where the labeling unit 62 itself decides a label to add on the basis of a visual feature of the extracted image, and a case where the user designates a label on-site. The former case includes processing for reviving a previously added label when a block that has once exited enters the target region again. Next, the output data acquiring unit 70 extracts conditions under which some sort of output is to be produced, set in association with the added label, from output contents information, and determines whether the detected block satisfies any of the conditions (S26).

In the case where a condition is satisfied (Y of S26), output data associated with the condition is acquired, and output as appropriate from the speaker 18 and the display device 16 (S28). In the case where an image of a block is not extracted (N of S20), and in the case where none of the conditions set in the output contents information is satisfied (N of S26), the state is maintained as it is. As long as the user does not request the end of the processing (N of S30), similar processing is repeated using stereo images obtained at subsequent times t=1, 2, . . . (S32, S16 to S28).

Although detected blocks are all labeled as new blocks at t=0, at a subsequent time, a detection result is compared with that of the previous time, and if a new block is detected, the block is labeled (Y of S22, S24). If there is no new block, processing for labeling is skipped (N of S22). If the user requests the end of the processing via the input device 14 or the like, the whole processing is ended (Y of S30). Through the processing in S18, a depth image expressing only an image of a block, like the image 114 of FIG. 6, is obtained for each frame of the captured moving image. The depth image expresses a position of the block in a three-dimensional space; thus, tracking a temporal change therein enables output according to a movement and a position in the three-dimensional space.

For the sake of easy understanding, the drawings described so far illustrate a state where only a block is present in the target region; however, in a mode in which the user holds and moves a block, the user's hand and arm may also be present in the target region. On this occasion, the target detecting unit 60 extracts an image of the hand as well, but the influence of presence/absence of a hand on processing is reduced by tracking a change in position at minute time intervals using, as a target, an image at the time when a label is added.

For example, if a block that is not held by a hand is detected and labeled, even if the user holds the block and thus an image changes in shape at a subsequent time, the block can be tracked with its label maintained, on the basis of position continuity, a visual feature of the block portion, or the like. Moreover, the change in shape can serve as a trigger for detecting that the block is held by a hand. In the case where a block being held by a hand is detected and a label is added according to designation by the user or the like, the label is associated with an image of the hand and the block being coupled to each other, but providing a position derivation rule (e.g., to regard a position of the tip thereof as a position of the block) allows processing similar to that in the above description to be performed.

In this case, even if the user removes his/her hand during tracking and thus an image changes in shape, the remaining block takes over the label on the basis of position continuity, a visual feature of the block, or the like, which enables continuous tracking. Moreover, the change in shape can serve as a trigger for detecting that the hand is removed. In order to more strictly detect and track only an image of a block, an image of the user's hand may be separated from an image of a block. For example, a visual feature of a person's hand, such as a color, a shape, and a texture, is registered in the target information storage unit 64, and a portion that seems to be an image of a hand is excluded from an extracted image.

Alternatively, by using a property that an arm extends across the inside and the outside of the target region because the arm is connected with the user's body outside the target region, an image that is broken at a side surface or a top surface of the target region may be regarded as an image of a hand. In this case, it is possible to specify and exclude only an image of a hand by tracing a texture or an outline continuous from a surface of the target region as a base point, for example. Note that since the target region defines the top surface as well, even if a block is put in from above the play field 20, the block becomes a detection/tracking target at the time when it comes at a height equal to or lower than the height of the target region.

In this manner, even in a state where a block is held by the user in midair, the block can serve as a detection/tracking target as long as it is present in the target region. Moreover, at a first registration of a block, the display device 16 or the like may instruct the user to place the block at a predetermined position on the play field 20, so that information on a shape or the like of the block can be registered accurately in the target information storage unit 64. Even in failure of tracking, tracking can be restarted if a block is recognized again through a procedure such as making the user place the block at a predetermined position again.

Various combinations of such processing enable the following situations to be detected, for example. Thus, a variety of information processing according to situations can be implemented by a simple configuration.
(1) There is nothing in the target region.
(2) Only a block is placed in the target region.
(3) A block is being moved by the user or the like in the target region.
(4) Only a hand has entered the target region/exited the target region.
(5) A hand has held a block/released a block.
(6) A held block has entered the target region/exited the target region.

Figure 8:
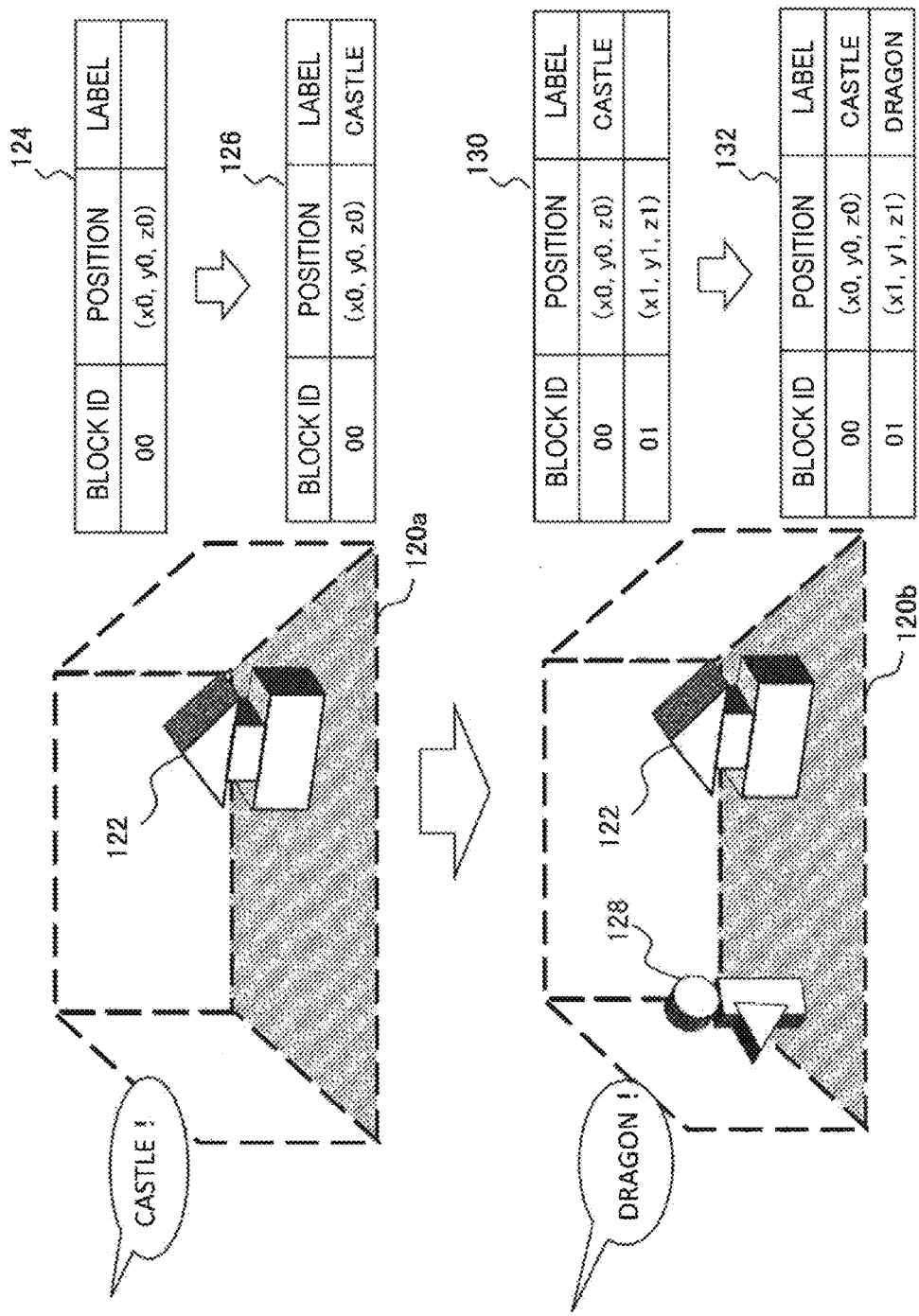
FIG. 8 schematically illustrates how a name designated by voice by a user is added as a label in S24 of the flowchart of FIG. 7.

Next, a specific example of a mode that can be implemented by the above configuration will be described. FIG. 8 schematically illustrates how a name designated by voice by the user is added as a label in S24 of the flowchart of FIG. 7. First, assume that the user has placed a block 122 as in a target region 120a illustrated in the upper stage. The target detecting unit 60 extracts an image of the block 122, so that presence of the block in the target region and its position are specified. Hence, the target detecting unit 60 adds an identification number "00" to the detected block and provides notification of its positional information (x0, y0, z0) in association with the identification number to the labeling unit 62, as shown in a table 124 for example.

The positional information here may be, for example, information that expresses the center of gravity of a region expressing an image of a block using on-image positional coordinates and a distance z0 from the imaging surface, or may be positional coordinates in a world coordinate system, obtained by inverse projective transformation of the on-image positional coordinates into a three-dimensional space using the distance z0. Alternatively, the positional information may be an image expressing a position of the entire image rather than the center of gravity, or may be a position and a size of a quadrangle circumscribing the image. Feature information, such as a color and a size, may be associated in addition to positional coordinates. Strictly speaking, the block 122 is brought in from the outside of the target region to be placed at the position illustrated, and in the meantime the target detecting unit 60 updates the positional information in the table 124.

Also in the case where the block 122 keeps being moved without being placed, the positional information is updated whenever necessary. Here, if the user says "CASTLE!" as a label for the block 122, the sound recognizing unit 66 notifies the labeling unit 62 of the word. Then, as shown in a table 126, the labeling unit further associates a label of "CASTLE" with the information in the table 124, of which notification is provided from the target detecting unit 60. Then, the output data acquiring unit 70 is notified of the information in the table 126.

Now assume that the user has placed a block 128 as in a target region 120b illustrated in the lower stage. Also in this case, the target detecting unit 60 extracts an image thereof, so that presence of a block other than the block 122 in the target region and its position are specified. Hence, the target detecting unit 60 adds an identification number "01" to the detected block and provides notification of its positional information (x1, y1, z1) in association with the identification number to the labeling unit 62, as shown in a table 130 for example. The information of which notification is provided here may be only information about the newly detected block.

Here, if the user says "DRAGON!" as a label for the block 128, the sound recognizing unit 66 notifies the labeling unit 62 of the word. Then, as shown in a table 132, the labeling unit further associates a label of "DRAGON" with the information of which notification is provided from the target detecting unit 60. Then, the output data acquiring unit 70 is notified of the information in the table 132. With this configuration, the user only says a name of an object that he/she wants to liken a block to, and thus even a block having an arbitrary shape can be recognized as the object at the information processing device 10 side.

The output data acquiring unit 70 retains information with a structure as in the table 132, and updates positional information included in the information, according to results of tracking that the target detecting unit 60 performs. This makes it possible to monitor whether a condition under which some sort of data is to be output, which is set for a label of the detected block, is satisfied. If the target detecting unit 60 detects that any of the blocks has exited the target region, the output data acquiring unit 70 deletes an entry of the corresponding block from the table, thereby excluding the block from monitoring targets for data output.

FIG. 9 schematically illustrates how a sound is output when a labeled block satisfies a predetermined condition in S28 of the flowchart of FIG. 7. The illustrated example assumes a case where output contents information in the table below is stored in the target information storage unit 64, for the labels of "CASTLE" and "DRAGON" illustrated in FIG. 8.

TABLE 1

| Label | Condition | Output sound |
|---|---|---|
| DRAGON | vibration in vertical direction | flutter |
| DRAGON/CASTLE | distance equal to or less than threshold value | "HELP!" |
| DRAGON | sound of "FIRE DRAGON!" | growl |
| . . . | . . . | . . . |

First, (a) of FIG. 9 illustrates the user shaking the block of "DRAGON" vertically. On this occasion, assume that a condition in the second row of the output contents information shown above, i.e., a situation where "DRAGON" is in "vibration in vertical direction", is satisfied. Then, the output data acquiring unit 70 outputs sound data of "flutter", set as a sound to be output, from the speaker 18. Note that more detailed criteria, such as the number of vibrations, vibration frequency, and vibration direction, may actually be set for "vibration in vertical direction". Thus, a situation can be presented as if a dragon is flying.

In addition, (b) of FIG. 9 illustrates the user bringing the block of "DRAGON" close to the block of "CASTLE". Assume that a condition in the third row of the output contents inthrmation shown above, i.e., a situation where the distance between "DRAGON" and "CASTLE" is equal to or less than a threshold value, is satisfied. Then, the output data acquiring unit 70 outputs sound data of a person crying "HELP!", set as a sound to be output, from the speaker 18. Note that a specific value is actually set as the threshold value of the distance. Moreover, a condition may be set with respect to an approaching direction. Thus, a situation can be presented as if a person in a castle attacked by a dragon is asking for help.

In addition, (c) of FIG. 9 illustrates the user saying "FIRE DRAGON!". On this occasion, assume that a condition in the fourth row of the output contents information shown above is satisfied. The output data acquiring unit 70 outputs sound data of "growl", set as a sound to be output, from the speaker 18. This processing is triggered by a sound produced by the user, which is different from a position and a movement of the block of "DRAGON", but "DRAGON" is set as the "label" in the above table because the presence of the block of "DRAGON" is a precondition. Producing a sound effect or the like also on the basis of various types of input information (e.g., the user's sound) in this manner enables various presentations based on intuitive operation.

Figure 10:
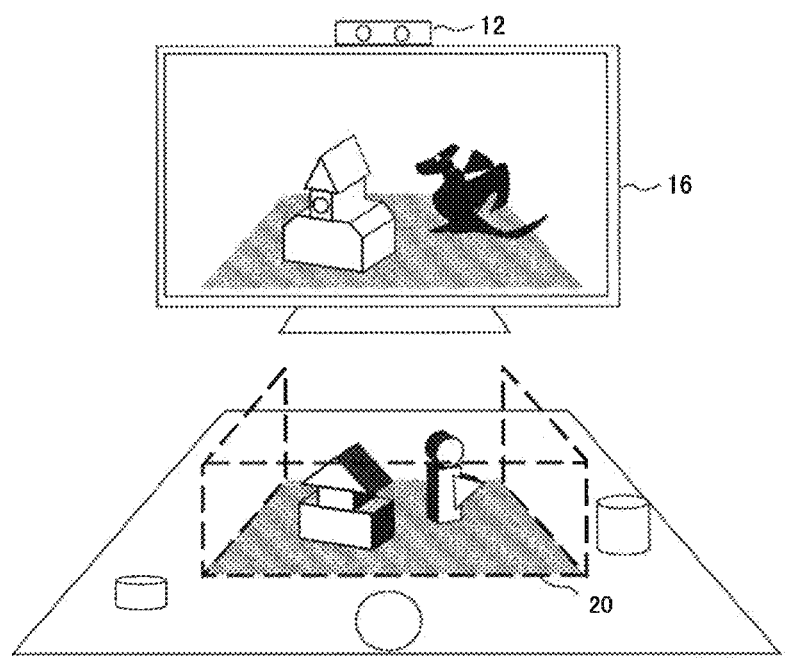
FIG. 10 schematically illustrates how an image is displayed/updated when a labeled block satisfies a predetermined condition in S28 of the flowchart of FIG. 7.

FIG. 10 schematically illustrates how an image is displayed/updated when a labeled block satisfies a predetermined condition in S28 of the flowchart of FIG. 7. This drawing illustrates real space including the display device 16, the imaging device 12, and the play field 20 in an arrangement similar to that illustrated in FIG. I, as viewed from a direction confronting the imaging device 12 and the display device 16. The illustrated example assumes a case where output contents information in the table below is stored in the target information storage unit 64, for the labels of "CASTLE" and "DRAGON" illustrated in FIG. 8.

TABLE 2

| Label | Condition | Model data | Rendering position |
|---|---|---|---|
| DRAGON | present in target region | DRAGON MODEL | left-right inversion |
| CASTLE | present in target region | CASTLE MODEL | left-right inversion |
| ... | ... | ... | |

In the above table, the presence of the blocks of "DRAGON" and "CASTLE" in the target region is set as a condition. Accordingly, the entire period from the time when the labels of "DRAGON" and "CASTLE" are added to blocks that have entered the target region until the exit of the blocks from the target region is compliant with the condition. Hence, the output data acquiring unit 70 acquires data of 3D models of "DRAGON MODEL" and "CASTLE MODEL" associated with the respective labels, and renders the 3D models as display images. In the case where it is possible to specify the front/back orientation of a block from an image in the captured image, the orientation may be reflected in the orientation of an object to render.

In addition, when "Rendering position" is subjected to "left-right inversion" from positions of images in the captured image, as in the above table, 3D objects corresponding to the respective blocks can be displayed as if reflected in a mirror, as illustrated in the drawing. In the present embodiment, a depth image at each time is generated; thus, a position of a block in a three-dimensional space, including a position in the depth direction, can be accurately reflected in a display image. Accordingly, the output data acquiring unit 70 can display a moving image in which a 3D object on the display image moves in correspondence with a change in the position of the block in real space.

Consequently, an object in a virtual space on a display image can be moved by moving a block in real space. Moreover, as in the case of sound output described above, some sort of change may be caused in the image, according to movements and distances of individual blocks, the user's voice, or the like. Furthermore, combining sound output enables expression giving more realistic feeling. Note that as well as displaying a virtual world, it is also possible to display an image close to real space. For example, an image captured by the imaging device 12 may be subjected to left-right inversion and displayed.

Alternatively, only an image of a block inside the target region in such a captured image may be displayed with a 2D or 3D object model superimposed thereon. Thus, in the case where a large number of blocks are present, for example, the user can easily know which block is likened to what. In this manner, image display can be used as reference information in play mainly using blocks. Similarly, if the user holds a block, the block may be highlighted by, for example, image processing to let the displayed block glow.

It is also possible to display the entire captured image, including blocks that have not entered the target region, and highlight a block only when the block enters the target region, by letting the block glow or changing its color on the image. Highlighting a held block and a block put in the target region makes it possible to confirm a reaction of the information processing device 10 to such operations; thus, the user can proceed with subsequent work with a feeling of security that a block of the user's interest is recognized by the information processing device. These modes can also be implemented easily if conditions and contents of image processing to be performed in correspondence with them are described in the output contents information in the above table.

According to the present embodiment described above, in an environment where a user plays by moving real objects, the play field 20 having a limited region is introduced into the field of view of the imaging device 12. Then, a space in a virtual three-dimensional object that has the play field 20 as a bottom surface and has a predetermined height is set as a target region, and an image of a real object inside the target region serves as a detection/tracking target. Thus, a real object of the user's interest can be specified easily. The user can designate a real object to use by a simple operation of putting the real object in the target region.

In addition, the processing focuses on an "image" in an image, rather than a real object itself, which enables labeling on-site. Consequently, it is possible to omit a complicated procedure of registration work, such as registering the omnidirectional shape of the real object beforehand. Moreover, real objects with free shapes can be used, without being limited to an object affixed with a marker or an object whose shapes is already registered. In addition, since an image of a surrounding person or object is excluded in the initial stage, even if such an image appears in the captured image, it is less likely to be confused with an image of the real object of interest. This improves both processing efficiency and tracking precision.

Furthermore, the target region is set in a three-dimensional space, and. inside/outside determination with respect to the target region is performed on the basis of a depth image; thus, a position of a real object in a three-dimensional space, including a distance in the depth direction from the imaging device, can also be acquired concurrently. In this manner, a positional relation between real objects present in the target region can also be acquired in the three-dimensional space, and a variety of information processing and output using detailed variables, such as distance and direction, can be performed. Furthermore, the capability of acquiring the user's voice using a microphone enables label designation and output data control by voice. This makes it easy for even a little child to play in a variety of ways using real objects. Moreover, the used blocks only need a simple structure without an internal circuit or the like, which allows inexpensive introduction.

The present invention has been described on the basis of an embodiment. The above embodiment is an example, and it would be understood by those skilled in the art that combinations of the components and the processing processes may include various modification examples, and such modification examples also come under the scope of the present invention.

For example, in the present embodiment, the play field 20 occupies the entire surface of the region, like a mat. Using a mat whose shape, size, and texture are known, for example, makes it possible to efficiently and precisely perform processing, such as setting a direction of an image of a side surface of the target region, setting a height of an image of a side surface, and separation from a block. In addition, the user's labor is reduced because play can be started by only spreading the mat. On the other hand, the present embodiment can be implemented even without a mat.

That is, a play field is a plane region for constituting a surface where a block is placed and defining a processing target space, and may be a partial or whole region on a large plane, such as a floor or a table, as long as the information processing device 10 can recognize the region. As an example in which the partial region is designated without using a mat, an image obtained by capturing an image of real space may be displayed on the display device 16, and the user may designate the region on the screen. For example, the user designates, on the screen, a point of the surface on which to place a block, such as a floor or a table. According to the specification, the information processing device 10 decides, as a play field, a circle with a predetermined radius or a polygon that has its center at the point.

Alternatively, a play field may be designated by placing predetermined objects, such as blocks, at positions desired to be vertices of a play field, instead of a mat. In this case, the information processing device 10 decides a region surrounded by a line connecting the vertices as a play field. The vertices may be designated by, as described above, input of position designation in the displayed captured image. Alternatively, instead of placing a block, when the user utters a predetermined word, such as "here", while pointing a finger at a position of a vertex, the position may be accepted as the position of the vertex. In this case, voice may be acquired via the microphone 15 while an image of the user is captured, and thus a position indicated by the finger at the time when the user says "here" may be acquired from the captured image. A region surrounded by a cord or the like may be used as the play field 20. These modes enable play or the like using real objects to be started regardless of places and situations.

Figure 11:
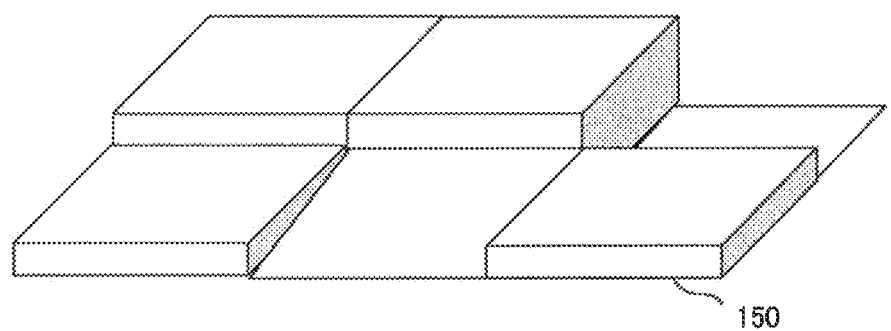
FIG. 11 illustrates an appearance example of a play field whose height varies depending on place in the present embodiment.

A play field is not limited to a plane, and may have a structure whose height varies depending on place. FIG. 11 illustrates an appearance example of a play field whose height varies depending on place. A play field 150 may be one mat whose thickness varies depending on place as illustrated in the drawing, or mat-like objects with various thicknesses coupled to each other. Alternatively, the play field 150 may be further complicated, e.g., may be diorama etc. imitating a scenery of a city or nature. In this case, in a process of generating a target region image, only the play field 150 is imaged and unevenness thereof is acquired as a depth image.

Then, on the basis of the depth image, a target region image is generated in a manner similar to that of the present embodiment. The imaging device 12 may be moved to a position directly above the play field 150 to capture an image; thus, the relation between a place and a thickness of the play field is acquired more accurately. In this case, a depth image obtained by imaging capturing in that way may be subjected to coordinate conversion into a state viewed from a viewpoint corresponding to a position of the imaging device 12 in operation, so that a bottom surface region of the target region image is expressed. In this manner, the play field 150 and a block placed thereon can be separated as in the present embodiment described above. Moreover, even if unevenness of the play field 150 changes over time, extraction of an image of a block can be performed similarly by creating a target region image again each time a change occurs.

One play field is provided in the present embodiment, but a plurality of play fields may be provided and similar processing may be performed on each play field. For example, a plurality of users are sorted into a plurality of play fields, and each user works only on the play field allocated to the user. If the information processing device 10 records correspondence information between the users and the play fields, a state of a block on a play field and a user can be associated with each other via the play field, and there is no need to specify a user to which an arm in the field of view of the imaging device belongs. This mode is particularly effective in a battle game etc. in which blocks do not cross each other,

REFERENCE SIGNS LIST

1 information processing system
3*a* block
10 information processing device
12 imaging device
14 input device
15 microphone
16 display device
22 CPU
24 GPU
26 main memory
52 input information acquiring unit
54 captured image acquiring unit
56 depth image acquiring unit
58 target region setting unit
60 target detecting unit
62 labeling unit
64 target information storage unit
66 sound recognizing unit
70 output data acquiring unit

INDUSTRIAL APPLICABILITY

As described above, the present invention can be used for an information processing device, such as a toy, a computer, a game device, and a content display device, and a system including any of them.

The invention claimed is:
1. An information processing device comprising:
a non-transitory computer-readable storage medium configured to store content data including model data of a virtual object; and at least one processor configured to
acquire a captured image of a real space from an imaging device,
specify a planar surface of a first real object in the captured image,
virtually set a three-dimensional target region on the planar surface of the first real object,
determine whether a second real object is present in the three-dimensional target region,
acquire a first audio signal uttered by a user from a microphone,
recognize a first word included in the first audio signal,
record the first word as label data of the second real object in the storage medium, when it is determined that the second real object is present in the three-dimensional target region,
determine whether the label data of the second real object corresponds to the model data of the virtual object, and
control a display device to display the virtual object at a depth position of the second real object with respect to the imaging device, when it is determined that the second real object is present in the three-dimensional target region and that the label data of the second real object corresponds to the model data of the virtual object.

2. The information processing device according to claim 1, wherein the three-dimensional target region is set to have a predetermined height corresponding to the first real object.

3. The information processing device according to claim 2, wherein the first real object comprises a play mat that is placed in the real space and has a predetermined size.

4. The information processing device according to claim 1, wherein the at least one processor is further configured to
generate a depth image based on the captured image, and
control the display device to display a boundary of the three-dimensional target region to correspond to the depth image.

5. The information processing device according to claim 1,
wherein the content data includes first sound data for the virtual object, and
wherein the at least one processor is further configured to
acquire a second audio signal uttered by the user from the microphone,
recognize a second word included in the second audio signal, the second word being different from the first word,
determine whether the second word corresponds to the first sound data, and
control a speaker to output a sound corresponding to the first sound data, when it is determined that the second real object is present in the three-dimensional target region and that the second word corresponds to the first sound data.

6. The information processing device according to claim 1,
wherein the content data includes motion data representing a predetermined movement and second sound data corresponding to the predetermined movement, and
wherein the at least one processor is further configured to
determine, based on the captured image, whether a movement of the second real object in the three-dimensional target region corresponds to the predetermined movement, and
control a speaker to output a sound corresponding to the second sound data, when it is determined that the second real object is present in the three-dimensional target region and that the movement of the second real object in the target region corresponds to the predetermined movement.

7. The information processing device according to claim 1,
wherein the content data includes a predetermined condition and third sound data corresponding to the predetermined condition, and
wherein the at least one processor is further configured to
determine a position of the second real object in the three-dimensional target region, and
control a speaker to output a sound corresponding to the third sound data, when it is determined that a positional relation between the second real object and at least one other real object in the three-dimensional target region satisfies the predetermined condition.

8. The information processing device according to claim 1,
wherein the at least one processor is further configured to
generate a depth image based on the captured image, and
represent the depth image as a pixel value on a captured image plane.

9. An information processing method executed by an information processing device, the method comprising:
acquiring a captured image of a real space from an imaging device;
specifying a planar surface of a first real object in the captured image;
virtually setting a three-dimensional target region on the planar surface of the first real object;
determining whether a second real object is present in the three-dimensional target region;
acquiring a first audio signal uttered by a user from a microphone;
recognizing a first word included in the first audio signal;
recording the first word as label data of the second real object in the storage medium, when it is determined that the second real object is present in the three-dimensional target region;
determining whether the label data of the second real object corresponds to the model data of the virtual object; and
controlling a display device to display the virtual object at a depth position of the second real object with respect to the imaging device, when it is determined that the second real object is present in the three-dimensional target region and that the label data of the second real object corresponds to the model data of the virtual object.

10. A non-transitory computer-readable recording medium having embodied thereon a program, which when executed by a computer causes the computer to execute a method, the method comprising:
acquiring a captured image of a real space from an imaging device;
specifying a planar surface of a first real object in the captured image;
virtually setting a three-dimensional target region on the planar surface of the first real object;
determining whether a second real object is present in the three-dimensional target region;
acquiring a first audio signal uttered by a user from a microphone;
recognizing a first word included in the first audio signal;

recording the first word as label data of the second real object in the storage medium, when it is determined that the second real object is present in the three-dimensional target region;

determining whether the label data of the second real object corresponds to the model data of the virtual object; and controlling a display device to display the virtual object at a depth position of the second real object with respect to the imaging device, when it is determined that the second real object is present in the three-dimensional target region and that the label data of the second real object corresponds to the model data of the virtual object.

* * * * *